(12) United States Patent
Markham

(10) Patent No.: US 8,468,977 B2
(45) Date of Patent: Jun. 25, 2013

(54) PET TOY WITH NOISE MAKING INSTRUMENT

(75) Inventor: Joseph P. Markham, Golden, CO (US)

(73) Assignee: The Kong Company, LLC, Golden, CO (US)

( * ) Notice: Subject to any disclaimer, the term of this patent is extended or adjusted under 35 U.S.C. 154(b) by 276 days.

(21) Appl. No.: 13/108,586

(22) Filed: May 16, 2011

(65) Prior Publication Data

US 2011/0214617 A1  Sep. 8, 2011

Related U.S. Application Data

(63) Continuation-in-part of application No. 11/870,995, filed on Oct. 11, 2007, now Pat. No. 8,342,132, which is a continuation-in-part of application No. 11/835,222, filed on Aug. 7, 2007, now Pat. No. 8,276,547.

(51) Int. Cl.
*A01K 29/00* (2006.01)

(52) U.S. Cl.
USPC .......................................... 119/709; 446/184

(58) Field of Classification Search
USPC ................. 119/709–711; 446/213, 216, 297, 446/397, 188, 184, 416, 404; 84/330, 83
See application file for complete search history.

(56) References Cited

U.S. PATENT DOCUMENTS

| | | | |
|---|---|---|---|
| 1,187,838 A | 6/1916 | Hughes | |
| 1,515,786 A | 11/1924 | Munro | |
| 1,668,785 A * | 5/1928 | Landon | 446/184 |
| 2,151,456 A * | 3/1939 | Wilhelm | 446/188 |
| 2,583,400 A | 1/1952 | Wade | |
| 3,487,741 A | 1/1970 | Ethridge | |
| 3,956,850 A | 5/1976 | Seidenberg | |
| RE29,050 E | 11/1976 | Hakim | |
| D256,958 S | 9/1980 | Markham | |
| 4,550,876 A | 11/1985 | Kulesza et al. | |
| 4,802,444 A | 2/1989 | Markham et al. | |
| D307,339 S | 4/1990 | Markham et al. | |
| D308,122 S | 5/1990 | Markham et al. | |
| 5,088,166 A | 2/1992 | Lavinio | |
| RE34,352 E | 8/1993 | Markham et al. | |
| D344,161 S | 2/1994 | Markham | |
| D349,786 S | 8/1994 | Markham | |
| 5,421,763 A | 6/1995 | Amburgey et al. | |
| D373,859 S | 9/1996 | Markham et al. | |
| 5,647,302 A | 7/1997 | Shipp | |
| 5,832,877 A | 11/1998 | Markham | |

(Continued)

OTHER PUBLICATIONS

International Search Report for International (PCT) Patent Application No. PCT/US12/38036, mailed Aug. 24, 2012 2 pages.

(Continued)

*Primary Examiner* — Timothy D Collins
*Assistant Examiner* — Brian M O'hara
(74) *Attorney, Agent, or Firm* — Sheridan Ross PC (57) ABSTRACT

A pet toy includes a noise making feature that can be selectively activated and deactivated by the pet owner. The noise making feature is in the form of a squeaker incorporated within the pet toy by an internal holding pocket that is integrally molded when the pet toy is manufactured. A control element is used to activate or deactivate the squeaker. The squeaker is positioned for easy access by the pet owner, but the construction of a squeaker assembly holding the squeaker is such that it prevents the animal from contacting the squeaker.

12 Claims, 10 Drawing Sheets

U.S. PATENT DOCUMENTS

| | | |
|---|---|---|
| 5,865,146 A | 2/1999 | Markham |
| 5,904,118 A | 5/1999 | Markham |
| 5,947,061 A | 9/1999 | Markham et al. |
| 6,032,387 A | 3/2000 | Johnson |
| 6,112,703 A | 9/2000 | Handelsman |
| 6,123,229 A | 9/2000 | Barish |
| 6,129,053 A | 10/2000 | Markham et al. |
| 6,216,640 B1 | 4/2001 | Zelinger |
| 6,234,458 B1 | 5/2001 | Gerhardy |
| D450,249 S | 11/2001 | Beaver |
| D456,270 S | 4/2002 | Beaver |
| 6,439,166 B1 | 8/2002 | Markham |
| 6,546,896 B1 | 4/2003 | Markham |
| 6,634,970 B2 | 10/2003 | Jiminez |
| 7,066,779 B2 | 6/2006 | Willinger |
| 7,087,260 B2 | 8/2006 | Axelrod |
| 7,096,826 B2 | 8/2006 | Markham |
| 7,144,293 B2 | 12/2006 | Mann et al. |
| RE39,563 E | 4/2007 | Markham |
| 7,201,117 B2 | 4/2007 | Ritchey et al. |
| 7,264,533 B2 | 9/2007 | Chan et al. |
| 7,833,079 B2 | 11/2010 | Willinger et al. |
| 8,235,762 B2 | 8/2012 | Rutherford et al. |
| 2002/0134318 A1 | 9/2002 | Mann et al. |
| 2004/0083983 A1 | 5/2004 | Markham |
| 2004/0089245 A1 | 5/2004 | Markham |
| 2005/0268861 A1 | 12/2005 | Curry et al. |
| 2005/0284409 A1 | 12/2005 | Ritchey et al. |
| 2006/0099878 A1 | 5/2006 | Willinger |
| 2006/0121822 A1 | 6/2006 | Willinger et al. |
| 2006/0254531 A1 | 11/2006 | Willinger |
| 2007/0015100 A1 | 1/2007 | Morris |
| 2007/0062459 A1 | 3/2007 | Costello et al. |
| 2007/0245976 A1 | 10/2007 | Ritchey et al. |
| 2007/0283900 A1 | 12/2007 | Jager |
| 2007/0287355 A1 | 12/2007 | Jager |
| 2008/0053380 A1 | 3/2008 | Ritchey et al. |
| 2008/0314331 A1 | 12/2008 | DeGhionno |
| 2009/0038559 A1 | 2/2009 | Markham |
| 2009/0038560 A1 | 2/2009 | Markham |
| 2010/0064983 A1 | 3/2010 | Ritchey et al. |
| 2011/0226191 A1 | 9/2011 | Curry et al. |
| 2012/0031348 A1 | 2/2012 | Markham |
| 2012/0042835 A1 | 2/2012 | Curry et al. |
| 2012/0067294 A1 | 3/2012 | Curry et al. |
| 2012/0103274 A1 | 5/2012 | Curry et al. |
| 2012/0103275 A1 | 5/2012 | Curry et al. |

OTHER PUBLICATIONS

Written Opinion for International (PCT) Patent Application No. PCT/US12/38036, mailed Aug. 24, 2012 4 pages.

International Preliminary Report on Patentability for International (PCT) Patent Application No. PCT/US2008/069589, mailed Feb. 18, 2010 8 pages.

International Search Report for International (PCT) Patent Application No. PCT/US2008/069589, mailed Nov. 18, 2008 4 pages.

Written Opinion for International (PCT) Patent Application No. PCT/US2008/069589, mailed Nov. 18, 2008 6 pages.

Official Action for Canada Patent Application No. 2695627, dated May 10, 2011 2 pages.

* cited by examiner

PET TOY WITH NOISE MAKING INSTRUMENT

CROSS REFERENCE TO RELATED APPLICATIONS

This application is a continuation-in-part application of co-pending U.S. patent application Ser. No. 11/870,995 filed on Oct. 11, 2007 and Entitled: PET TOY WITH THERAPEUTIC FEATURES, which is a continuation-in-part application of U.S. patent application Ser. No. 11/835,222 filed on Aug. 7, 2007 and Entitled: PET TOY WITH THERAPEUTIC FEATURES, which are hereby incorporated in their entirety by reference.

FIELD OF THE INVENTION

The present invention relates to pet toys, and more particularly, to a pet toy having a noise making feature, commonly referred to as a squeaker and also referenced herein as a noise making instrument, and wherein the instrument/squeaker can be selectively disabled to prevent the squeaker from operating.

BACKGROUND OF THE INVENTION

Chewable pet toys have been available for many years. Rubber or plastic is the preferred material for chewable pet toys, and there are a tremendous number of different shaped pet toys, some of which incorporate features to clean the teeth and gums of the animal as the animal chews on the toy.

One example of a patent that discloses a pet toy with features formed on the outer surface of the toy to clean an animal's teeth and gums is the U.S. Pat. No. 6,439,166. This reference discloses an animal toy with raised features formed on the outer surface of the toy of various shapes and designs. The raised features may also have differing tips or ends that also have beneficial effects on the animal's mouth for dental cleaning.

Another patent reference that discloses a pet toy intended for dental cleaning is the U.S. Pat. No. 4,802,444. This reference discloses more specifically a pet toy made of an elastomeric material, and grooves formed on the outer surface of the toy that are sized and configured so that an animal that bites down on the toy will have its teeth and gums cleaned because the groove collapses around the teeth and gums.

Yet another patent reference disclosing a pet toy including features for cleaning the animal's teeth and gums is U.S. Pat. No. 5,865,146. The pet toy disclosed in this reference is characterized by an elongated hollow body, and a pair of spaced bulbous sections, each having a sidewall of substantially constant cross sections throughout. A plurality of longitudinally spaced angular ribs extends around the periphery of the bulbous sections forming grooves to facilitate an animal gripping the toy with its teeth. When the teeth of the animal deform the pet toy, the ribs deflect inwardly to clean the teeth and gums of the animal.

While these references may be adequate for their intended purpose, there is still a need for a pet toy that is especially adapted for providing dental cleaning wherein dental cleaning features are disposed on substantially all of the outer surface of the toy to ensure that despite the angle at which the animal may bite on the toy, the dental cleaning features will result in some stimulation of the teeth and gums of the animal. There is also a need to provide a pet toy with dental cleaning features wherein the cleaning features are of a robust design such that they are not easily torn off by the biting action of the animal, and further wherein the arrangement of the dental cleaning features do not detract from the structural integrity of the toy.

Another common feature with many pet toys is the provision of a noise-producing element such as a squeaker that produces a sound as the animal bites down on the toy. There are a number of problems associated with providing squeakers in a pet toy, such as the animal choking on the squeaker after it has been removed by the animal during play with the toy. One natural behavior for many animals is to make an attempt to "kill" the toy by gaining access to the squeaker, which can result in the undesirable choking or aspiration of the squeaker. Another problem associated with squeakers is that the noise produced can, over time, be a nuisance to the pet owner who wishes for the toy to be silent at selected times. Therefore, there is a need for a pet toy such that the squeaker is securely mounted within the pet toy and is difficult to access by the pet, yet the squeaker may be selectively disabled to quiet the pet toy at desired times.

SUMMARY OF THE INVENTION

In accordance with the present invention, an animal or pet toy is provided having a plurality of raised features formed on the outer surface of the toy for purposes of providing dental cleaning to the animal's teeth and gums. The raised features in the preferred embodiments are ribs or protrusions that extend in a linear fashion around substantially the entire outer surface of the pet toy. The ribs or protrusions are spaced from one another along the outer surface of the pet toy, and the space or gaps between the ribs may be defined as channels or grooves.

In the preferred embodiments, the ribs or protrusions are spaced uniformly from one another on the outer surface of the pet toy. Depending upon the particular shape of the pet toy, there may be groups or sets of protrusions that intersect with other groups or sets of protrusions. At the points of intersection, the protrusions may overlap, thereby providing additional structural strength to the pet toy in general, as well as to further stabilize a connection between the protrusions and the outer surface of the pet toy. These points of intersection also provide further enhanced dental cleaning since the overlapping configuration of the protrusions are provided in a manner to contact the animal's teeth and gums at different angles.

The animal toy is preferably made of a resilient, elastomeric material that prevents it from being destroyed when chewed on by the animal.

The inner surface of the pet toy defines a substantially hollow core. The thickness of the pet toy is defined by a sidewall that is substantially uniform. The sidewall is selected from a thickness that allows the pet toy to collapse a desired amount when an animal bites down on the pet toy. As the pet toy collapses under pressure, the protrusions therefore change their angle with respect to the animal's mouth, thereby providing additional cleaning benefits. Depending upon the type of animal using the toy, the thickness can be varied to provide a desired amount of rigidity or resiliency for limiting or increasing the degree of collapse that occurs.

Preferably, the protrusions extend perpendicularly away from the outer surface of the pet toy. As disclosed in the preferred embodiments, rounded or curved outer surfaces of the pet toy results in the protrusions extending away from the outer surfaces of the animal toy in a multitude of different angles. These multitude of different angles coupled with substantially the entire outer surface of the pet toy having the protrusions result in an increased chance that one or more of the protrusions will contact different tooth and gum surfaces of the animal's mouth.

Primary dental cleaning occurs when the teeth and gums of the animal contact the protrusions, and the protrusions are bent or deflected as they contact the animal's teeth and gums. The protrusions can be made more or less rigid, thus resulting in the desired degree of deflection as the animal's mouth comes into contact with the protrusions. The degree of resiliency of the material can also be varied to achieve the desired dental cleaning effect.

In yet another aspect of the present invention, food treats may be placed in the grooves in order to further entice the animal to play with the pet toy. The pet treats may include a paste-like material such as liver paste or peanut butter, which will be retained within the grooves. Toothpaste can also be used between the grooves to further assist in dental cleaning.

Also in the preferred embodiments, the particular shape of the protrusions can be chosen to maximize the intended purpose of the toy. In the preferred embodiments, the protrusions each have a pair of sidewalls that extend substantially perpendicular to the outer surface of the pet toy. The sidewalls may extend substantially parallel to one another, or the most outer edges of the side walls may converge towards one another resulting in a triangular shaped cross section. The distal tip or edge of the protrusions may be roughened, similar to a knurled finish, wherein the roughened tips or edges further assist in dental cleaning.

In yet another aspect of the present invention, an internal holding pocket is provided for placement of a squeaker. The squeaker is provided with a control element that enables the pet owner to control activation or deactivation of the squeaker. Manipulation of the control element can be achieved by a simple tool that is able to move the control element between an engaged and disengaged position with respect to the squeaker. In another embodiment, the squeaker can be activated or deactivated by an integral control element in the form of a screw that is received in the body of a squeaker housing that also holds the squeaker.

Additional features and advantages of the present invention will become apparent from the detailed description that follows, taken in conjunction with the accompanying drawings.

DETAILED DESCRIPTION OF THE DRAWINGS

Figures 1, 2, 3:
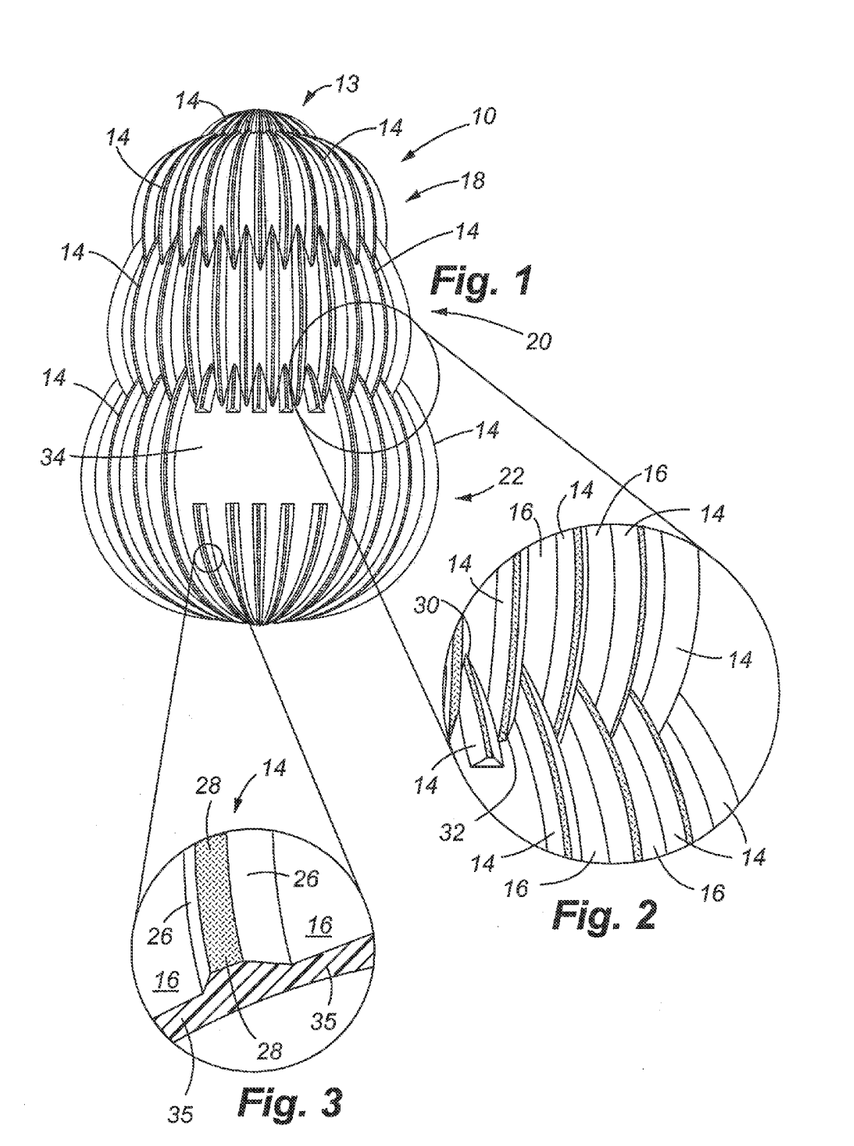
FIG. 1 is a perspective view of the first embodiment of the present invention.
FIG. 2 is a greatly enlarged portion of FIG. 1.
FIG. 3 is another greatly enlarged portion of FIG. 1.

FIG. 1 illustrates the first embodiment of the pet toy 10 of the present invention. In the first embodiment, the pet toy 10 shows a plurality of raised features 14 in the form of ribs or protrusions that extend away from the outer surface of the pet toy. The protrusions 14 extend linearly in groups or sets of protrusions, and the protrusions are uniformly spaced from one another in each group or set. In each of the embodiments, the groups or sets of protrusions can extend along a desired section or portion of the pet toy, and depending upon the portion of the pet toy upon which the sets of protrusions lie, the protrusions can be either substantially equal in length as they extend along the outer surface of the pet toy, or may be dissimilar in length. The particular shape of the pet toy 10 resembles the Kong® pet toy shape. A first group or set of protrusions 14 is disposed along a most upper portion or section 13 of the pet toy. Another set or group of protrusions are disposed along the upper middle section 18 of the pet toy that is located below section 13. Another set or group of protrusions 14 are disposed along the lower middle layer or section 20 of the pet toy. Yet another group or set of protrusions 14 are disposed along the lower layer or section 22 of the pet toy. Starting from the upper section, each section is progressively larger and each section has a generally rounded or bulbous shape.

Referring also to the FIGS. 2 and 3, further structural details of the protrusions 14 are shown. A plurality of grooves or channels 16 may be defined as the gaps between respective pairs of protrusions 14. Referring to FIG. 3, each of the protrusions includes a pair of sidewalls 26 and a most distal tip or surface 28. The sidewalls 26 can extend substantially parallel to one another, or the sidewalls 26 may taper toward one another at the surface 28. In order to enhance the cleaning of the animal's teeth and gums, the surface 28 may have a knurled or roughened finish as shown. The knurled finish provides some abrasiveness that removes plaque from the teeth and gums of the animal.

Preferably, the protrusions have a height that extends substantially perpendicular from the outer surface of the pet toy. Accordingly, the protrusions generally follow the shape or contour of the outer surface of the pet toy. In the case of FIG. 1, the compound shape of the pet toy results in the protrusions extending at multiple different angles away from the outer surface of the pet toy, thereby increasing the chance that an animal's teeth and gums will be cleaned through contact with the various angles protrusions.

Optionally, an open area or gap 34 may be formed on the pet toy wherein the outer surface of the pet toy is exposed, and no protrusions are found in that open area. This open area may facilitate placement of a trademark or other product identifying information.

Referring to FIG. 2, it is shown that the intersection or overlap of two abutting sets of protrusions results in yet a different angular configuration of raised features. Thus, additional cleaning benefits may be realized by this area of intersection. Additionally, the overlap of the protrusions adds some amount of structural strength to the pet toy. As shown in FIG. 2, one end 30 of a protrusion 14 extends beyond an opposing end 32 of the adjacent protrusion 14 thereby creating the overlapping configuration.

Figure 4:
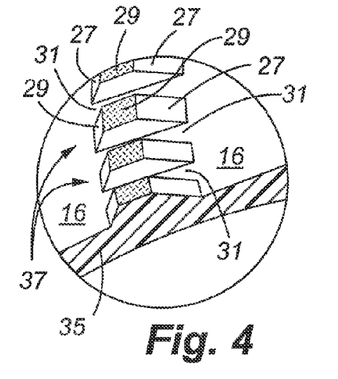
FIGS. 4-7 each illustrate a greatly enlarged portion of FIG. 1 in various embodiments of the invention corresponding to different types of protrusions.

Referring to FIGS. 4 through 7, various other embodiments are shown corresponding to different types of protrusions 14. Each of the different types of protrusions may provide dental cleaning benefits. In the embodiment of FIG. 4, the protrusions 14 each have a pair of sidewalls 27, a most distal tip or surface 29, and gaps or separations 31 between each individual segment or part 37. The segments are longitudinally aligned therefore presenting the appearance of a single continuous protrusion when viewed from a distance.

Figure 5:
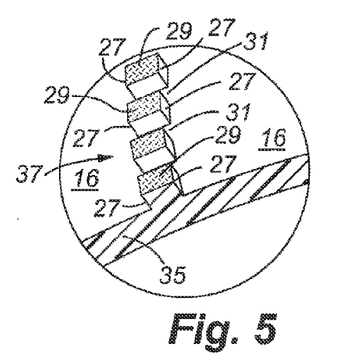

Referring to FIG. 5, another configuration is shown for the protrusions 14, the same reference numbers corresponding to similar structures shown in FIG. 4. Thus, in FIG. 5 the protrusions 14 also include a pair of sidewalls 27, a most distal tip or surface 29, and a gap or space 31 between each protrusion 14. In FIG. 5, sidewalls are substantially extending perpendicular from the external surface of the pet toy.

Figure 6:
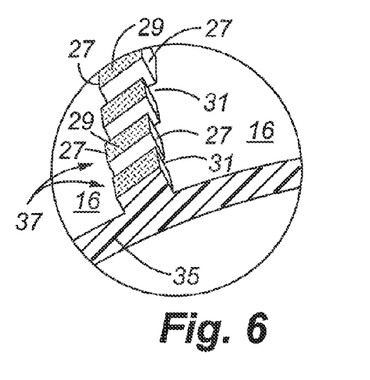

Referring to FIG. 6, yet another configuration is shown of the protrusions 14. Again, the same reference numbers are provided to denote similar structures in this configuration. As shown, the pair of sidewalls 27 extends substantially perpendicular from the outer surface of the pet toy, but the most distal tip or surface 29 is angled or tapered.

Figure 7:
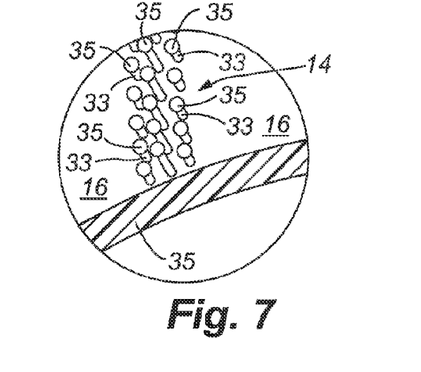

Referring to FIG. 7, yet another configuration is shown for the protrusions. The protrusions in this embodiment substantially differ from the other embodiments in that the plurality of protrusions 14 include individual extensions 33 spaced from one another, and wherein each extension 33 includes a tubular or cylindrical base, and a bulbous shaped tip 35. The extensions 33 may be configured in rows or columns and in the example of FIG. 7, the central column extends somewhat beyond the columns on both sides of the central column.

Figure 8:
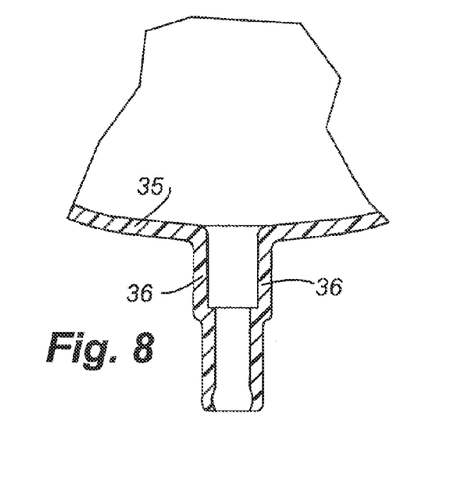
FIG. 8 is a fragmentary enlarged cross-section of FIG. 1 illustrating an internal holding pocket in a reversed position directly after manufacture wherein the mold used to make the pet toy results in the holding pocket extending away from the body of the pet toy.
Figure 12:
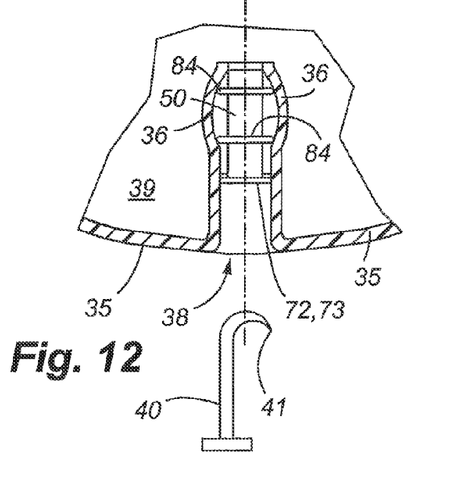
FIG. 12 is another fragmentary cross section illustrating an alternative construction for the internal holding pocket and squeaker.

FIG. 8 illustrates a structure that forms an internal holding pocket that receives a noise-making instrument, as discussed below with respect to FIGS. 9, 10 and 12. In the manufacturing process, it may be easier to provide a mold wherein the internal holding pocket is formed by reversing the sidewalls 36 that form the internal holding pocket.

Figure 9:
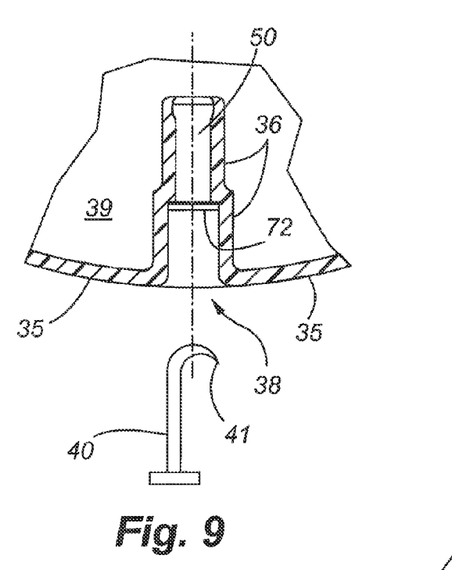
FIG. 9 is a fragmentary enlarged cross-section of FIG. 1 illustrating the internal holding pocket placed in its normal position and illustrating a squeaker placed in the internal holding pocket.

Now referring to FIG. 9, in another aspect of the invention, the internal holding pocket 38 is illustrated that receives the noise-making instrument, such as a squeaker 50. In FIG. 9, the sidewalls have been reversed by pushing them within the interior or core 39 of the pet toy. The internal holding pocket 38 is integrally molded with the sidewall 35 of the pet toy. Therefore, the internal holding pocket 38 is not a separate element that is attached to the pet toy and rather, can be integrally formed during the molding process for making the pet toy. The internal holding pocket 38 includes the internal sidewalls 36 defining a chamber or opening that frictionally receives the squeaker 50. In the particular configuration shown in FIG. 9, the internal holding pocket 38 has a two-tiered internal diameter that accommodates activation or deactivation of the squeaker 50, as discussed further below.

Figure 10:
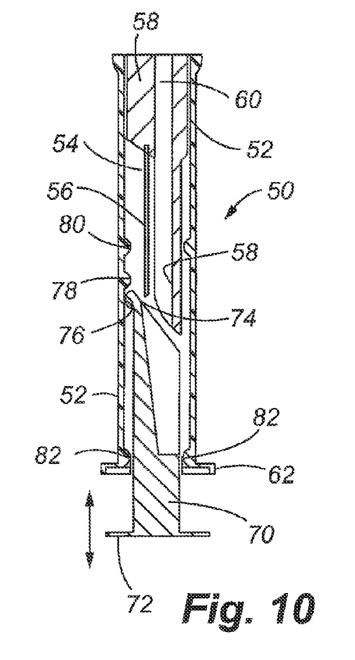
FIG. 10 is an enlarged cross sectional view of a squeaker and control element that activates or deactivates the squeaker.

Referring to FIG. 10, the squeaker 50 is illustrated along with a control element 70 that is used to activate or deactivate the squeaker. As well understood by those skilled in the art, a common squeaker is a simplified musical instrument, typically in the form of a single reed instrument wherein a very thin reed is secured against an aperture. When air is forced between the reed and the body of the squeaker surrounding the reed, the reed vibrates thus producing a sound. In FIG. 10, the squeaker 50 more particularly includes a body 52 that encloses a chamber 54. A reed 56 is secured to the body and extends within the chamber 54. The front portion 58 of the squeaker includes an air passage 60 that communicates with the chamber 54. When air is forced through the air passage 60 into the chamber 54, the reed 56 vibrates to produce a sound. The squeaker 50 also includes a flange or rim 62 with a slightly larger diameter than a diameter of the body 52. The flange 62 is seated against the ledge separating the smaller and larger sidewalls 36.

The control element 70 is a tubular member having a flange 72 and a forward contacting edge 74. A tab 76 forms the most distal part of the control element. Disposed on the interior surface of the body 52 are at least two detents 78 and 80. If it desired to deactivate or inhibit operation of the squeaker 50, the control element 70 is fully inserted within the body 52 such that the forward contacting edge 74 makes contact with the reed 56, thereby preventing the reed from vibrating. In this position, the tab 76 is disposed between detents 78 and 80, thereby holding the control element in a locked position. If it is desired to activate the squeaker, the control element 70 is withdrawn from the body 52 such that the tab 76 resides on the opposite side of detent 78 and the forward contacting edge 74 does not make contact with the reed 56, thereby allowing the reed to freely vibrate when air passes through the passage 60. Another pair of detents 82 may be formed on the interior surface of the body 52. These detents 82 serve to provide some frictional engagement of the body 52 against the control element 70 such that when the control element is withdrawn as shown in FIG. 10, the control element will not completely slide out of the body 52. As shown in FIG. 9, a simple tool 40 may be used to move the position of the control element in order to activate or deactivate the squeaker 50. The hook portion 41 of the tool can be used to push or pull the control element to the desired position.

Figure 11:
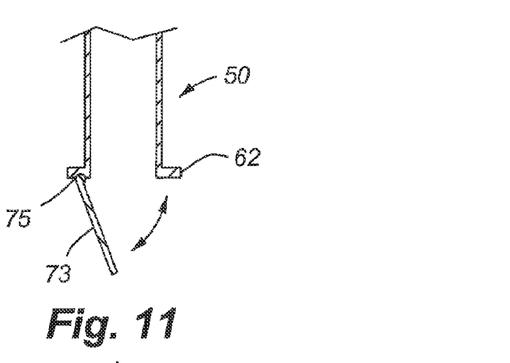
FIG. 11 is another enlarged cross-sectional view of a squeaker and an alternate control element that activates or deactivates the squeaker.

FIG. 11 illustrates another embodiment wherein a control element 73 replaces the control element 70. The control element 73 is shown as a hinged cap 73 that is used to control air flowing through the interior of the squeaker. The hinged cap 73 rotates about hinge point 75. As shown in FIG. 11, the control element 73 is in the open position whereby air is allowed to flow through the squeaker. Thus, the reed 56 is able to vibrate to produce a sound. If it is desired to deactivate the squeaker to prevent noise from being produced by the squeaker, the control element 73 may be rotated such that it is placed in contact with the flange 62 thereby preventing airflow through the interior of the squeaker. The tool 40 may be used to either close or open the control element 73 to thereby activate or deactivate the squeaker FIG. 12 illustrates a different arrangement for the internal holding pocket 38 wherein instead of the internal holding pocket defining a substantially cylindrical opening or gap, the internal holding pocket 38 defines a bulbous shaped chamber, and ribs 84 formed on the outer surface of the squeaker 50 are used to frictionally engage the sidewalls 36 of the internal holding pocket to prevent the squeaker 50 from being removed. The outer surface of the squeaker can stretch the sidewalls 36 thereby ensuring the squeaker is adequately held.

Figure 13:
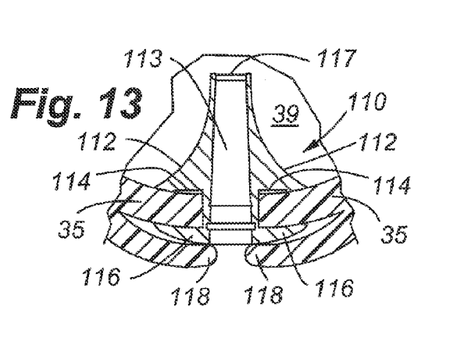
FIG. 13 is another fragmentary cross-section illustrating an alternative construction for a squeaker, as well as an alternative construction for the internal holding pocket.
Figure 14:
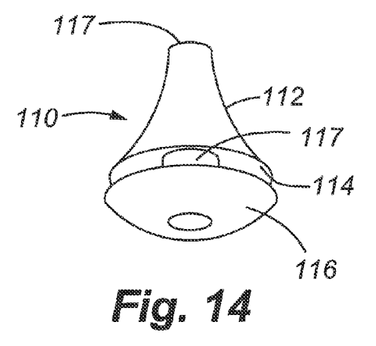
FIG. 14 is a perspective view of the squeaker shown installed in FIG. 13.

FIGS. 13 and 14 illustrates another embodiment of the present invention including a different construction for a noise-making instrument/squeaker 110, as well as a different structure for holding the noise-making instrument within the pet toy. In this embodiment, a pair of converging lips or extensions 118 extends from the sidewall 35 of the pet toy. The noise-making instrument/squeaker 110 includes a body or housing 112, a rim or flange 116 that resides in the gap or space between the sidewall 35 and the converging lips 118, and a neck 117 interconnecting the body 112 and rim 116. The squeaker 110 extends through the opening formed in the sidewall. The body 112 houses a central portion 113 that contains the noise-making features, such as shown in the embodiment in FIG. 10. Preferably, central portion 113 is the actual noise-making feature that is inserted within the housing 112. To install the squeaker 110, the distal end 117 of the squeaker is first inserted in the space or gap between the converging lips 118, then the squeaker 110 is pressed such surface 114 resides on the interior surface of the sidewall 35, and the rim 116 reside on the exterior side of the sidewall 35. The gap or space between the sidewall 35 and the converging lips 118 may be sized to allow the control element to be activated or deactivated as necessary. The converging lips 118 help to cover access to the squeaker thereby ensuring that the squeaker is not inadvertently removed by the play action of the animal. Preferably, the housing 112 and rim 116 is an integral unit made of an elastomeric material such as rubber. The central portion 113 defining the noise-making component may be constructed of a plastic material. Thus, the squeaker 110 can be considered a two-part element.

Figure 15:
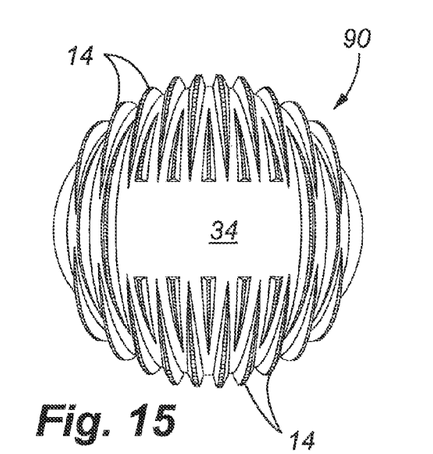
FIG. 15 is a perspective view illustrating another preferred embodiment of the present invention.

FIG. 15 illustrates yet another embodiment of the present invention showing a pet toy 90 that is spherical shaped. Like the first embodiment, a plurality of protrusions 14 are provided and some overlap occurs between different sets or groups of protrusions.

Figure 16:
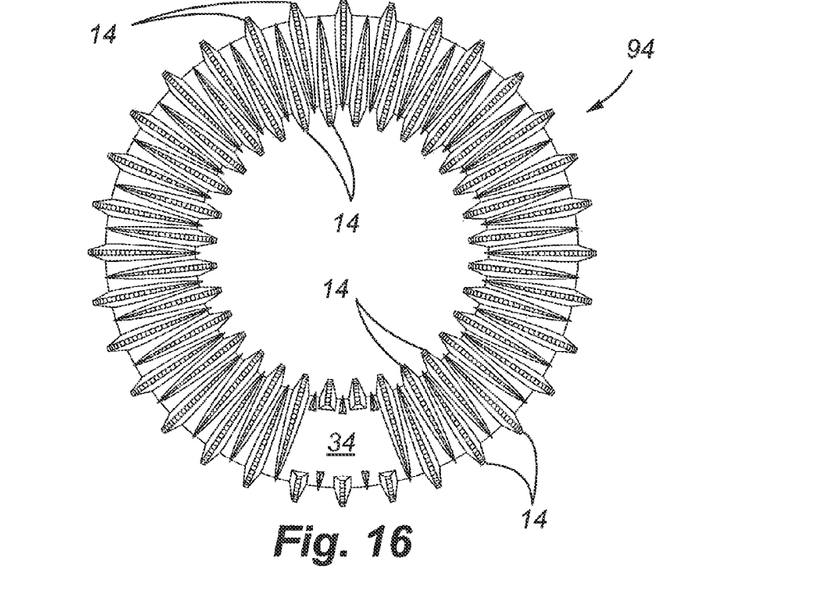
FIG. 16 is a plan view illustrating another embodiment of the present invention.

FIG. 16 illustrates yet another embodiment showing a pet toy 94 that has a ring shape. In this embodiment, the plurality of protrusions 14 include one set or group that are disposed on the outer peripheral edge of the pet toy, and an opposing set or group of protrusions 14 are disposed on the inner or interior surface and wherein the respective sets of protrusions alternately overlap one another along the entire periphery of the pet toy.

Figure 17:
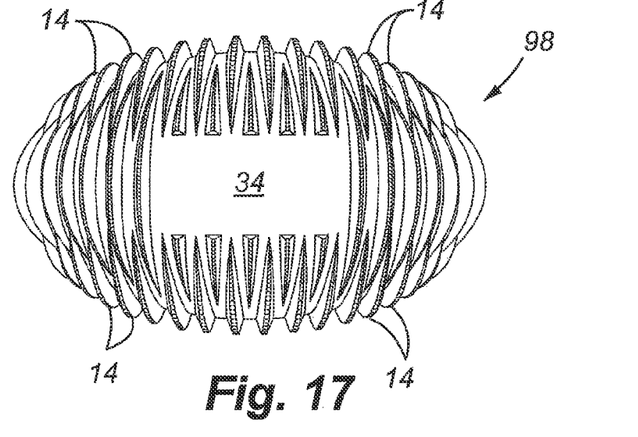
FIG. 17 is a side elevation view illustrating yet another preferred embodiment of the present invention.

FIG. 17 illustrates yet another preferred embodiment of the present invention wherein the pet toy 98 has an oval shape resembling a football or egg. This embodiment also has respective sets or groups of protrusions 14 that intersect one another along the outer surface of the pet toy. In the embodiments of FIGS. 7 and 9, there are two areas of intersection shown between the respective sets of protrusions.

Figure 18:
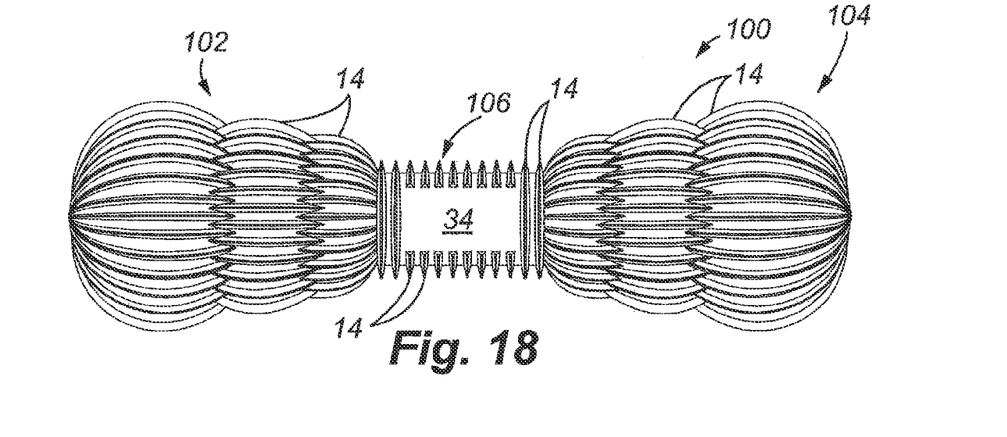
FIG. 18 is another side elevation view illustrating yet another preferred embodiment of the present invention.

FIG. 18 illustrates yet another preferred embodiment of the present invention wherein a pet toy 100 includes three distinct parts; namely, end parts 102 and 104, and an interconnecting bridge or centerpiece 106. Parts 102 and 104 have substantially the same shape as the first embodiment. Thus, FIG. 17 resembles a dumbbell. The plurality of protrusions formed on the centerpiece or bridge 106 extend substantially perpendicular with respect to the direction of the protrusions 14 formed on parts 102 and 104.

In the embodiments of FIGS. 15-18, the optional open areas 34 may also be provided to place a trademark or other product identifying information.

Figures 19, 20, 21:
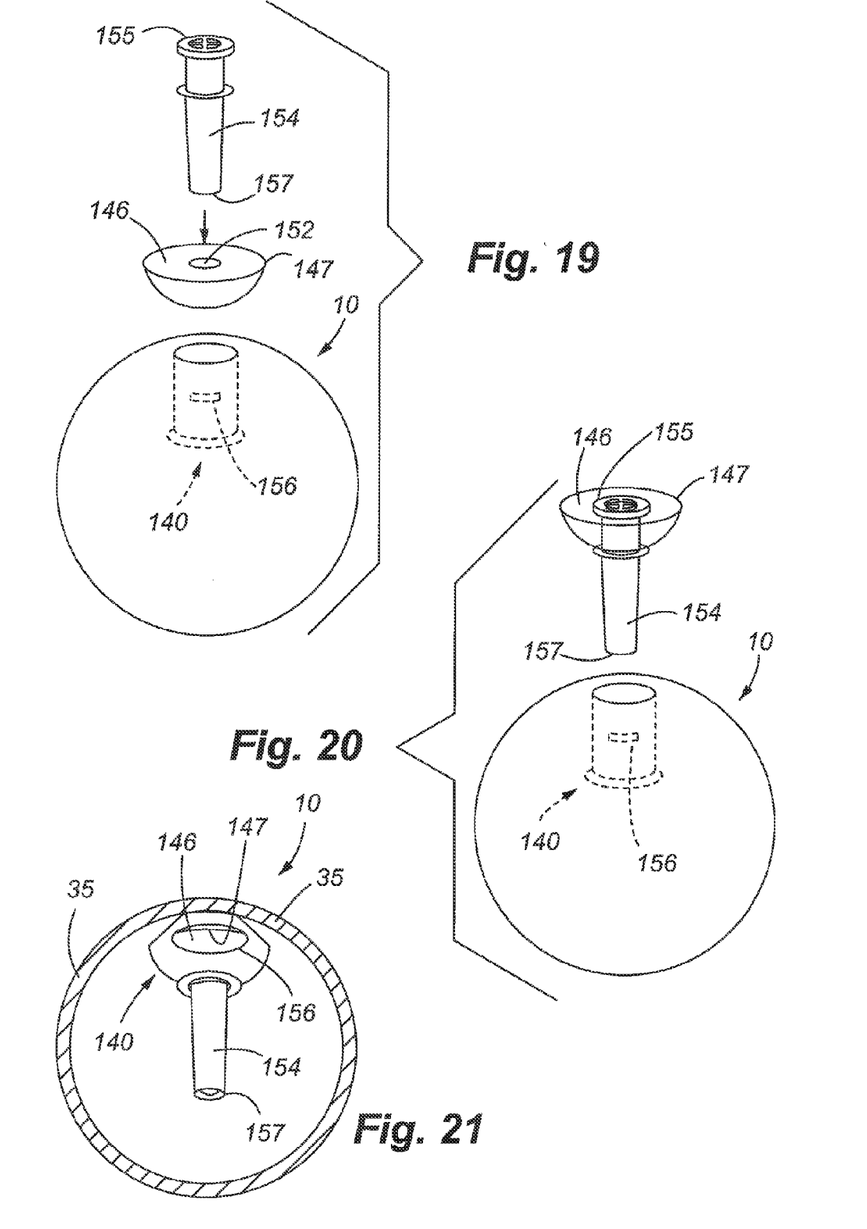
FIG. 19 is an exploded perspective view of an alternate construction for incorporating a squeaker within the present invention.
FIG. 20 is a partially assembled view of FIG. 19.
FIG. 21 is a cross-section of FIG. 19 showing the pet toy of the present invention and the squeaker placed in the internal holding pocket.

FIG. 19 illustrates yet another arrangement for the incorporation of the squeaker. As shown in FIG. 19, an internal holding pocket 140 is disposed within the interior of the pet toy. The internal holding pocket can be constructed integrally with the pet toy in the same manner as shown with respect to FIG. 8. An element is used to interconnect the squeaker 154 to the holding pocket 140, namely a half spherical or curved retaining element 146. The retaining element 146 has an opening 152 that receives the squeaker 154 and the squeaker 154 is frictionally held within the opening 152. The element 146 and squeaker are then inserted within the internal holding pocket 140. The element 146 has a lip or peripheral edge 147 that is received within one or more slots 156 that are formed in the internal holding pocket. Accordingly, as shown in FIG. 21 in the cross-section, the slot 156 stretches to receive the peripheral edge 147 of the element 146. Preferably, the squeaker 154 is disposed within the internal holding pocket 140 such that the upper surface 155 of the squeaker 154 is recessed within the internal holding pocket, thereby making access to the squeaker more difficult for the animal. The distal end or tip 157 of the squeaker 155 extends beyond the internal holding pocket into the hollow core of the animal toy. The length of the internal holding pocket 140 can be sized so that adequate frictional engagement is provided to hold the squeaker 154.

Figures 22, 23, 24:
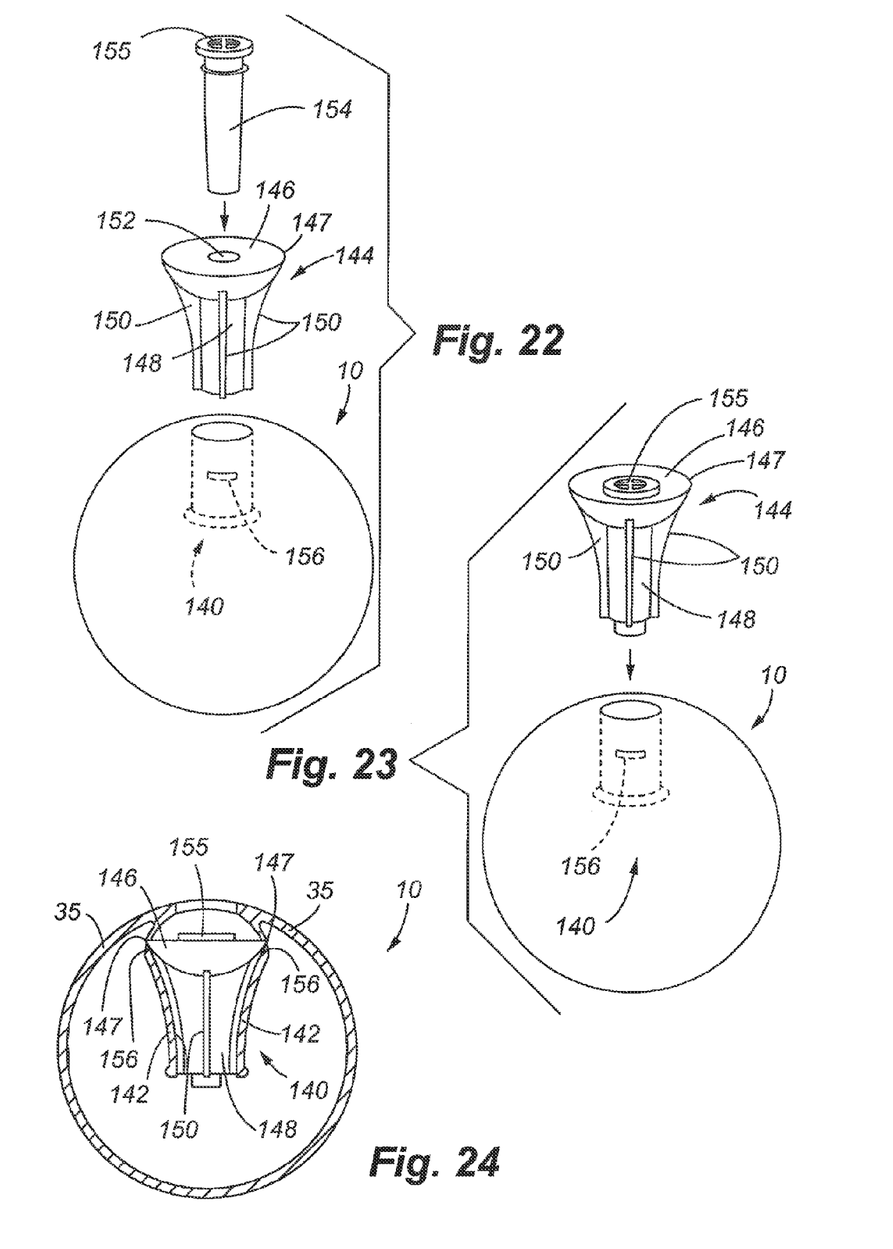
FIG. 22 is another exploded perspective view of another alternate construction for incorporation of the squeaker in the present invention.
FIG. 23 is a partially assembled view of FIG. 23.
FIG. 24 is a cross-section of FIG. 22 illustrating the squeaker installed within the pet toy.

FIGS. 22-24 illustrate yet another arrangement for incorporating the squeaker within the pet toy. In the embodiment of FIGS. 22-24, the retaining element 146 is supplemented with other elements to form a housing 144 that frictionally engages a greater surface of the squeaker 154. In this arrangement, the squeaker housing 144 includes the retaining element 146 as well as a base 148 extending from the element 146, and a plurality of retaining flanges 150 formed on the exterior edge or surface of the base 148. The squeaker housing 144 receives the squeaker 154 by inserting the squeaker 154 into the opening 152. The squeaker 154 is frictionally held within the opening 152, and then the housing 144 and squeaker 154 are inserted within the internal holding pocket 140 wherein the housing 144 frictionally engage the internal sidewalls 142 of the holding pocket 140.

Although the retaining element 146 is shown as having a semi-spherical shape, it shall be understood that the retaining element 146 can be made of other shapes that frictionally engage the internal holding pocket and provide frictional engagement with the outer surface of the squeaker 154.

When the housing 144 is inserted within the internal holding pocket, the lip or peripheral edge 147 of the retaining element 146 causes the internal sidewalls 142 to stretch, thereby providing a firm, frictional engagement between the housing 144 and the internal holding pocket 140. Optionally, the internal holding pocket may include the one or more slots 156 that receive the peripheral edge 147 of the retaining element 146. The retaining flanges 150 also help to maintain frictional engagement of the housing 144 within the internal holding pocket 140.

As shown in FIG. 24, the squeaker 154 is disposed within the internal holding pocket 140 such that the exposed surface 155 of the squeaker 154 is recessed within the internal holding pocket, thereby making access to the squeaker element very difficult for an animal. The size and shape of the opening 152 can be modified to accept various different types of noise making instruments.

In FIGS. 19-24, the plurality of raised features have been omitted in order to more clearly illustrate the structure of the internal holding pocket, it being understood that the embodiments of FIGS. 19-24 may incorporate a plurality of raised features such as illustrated in the embodiment of FIG. 15.

Figure 25:
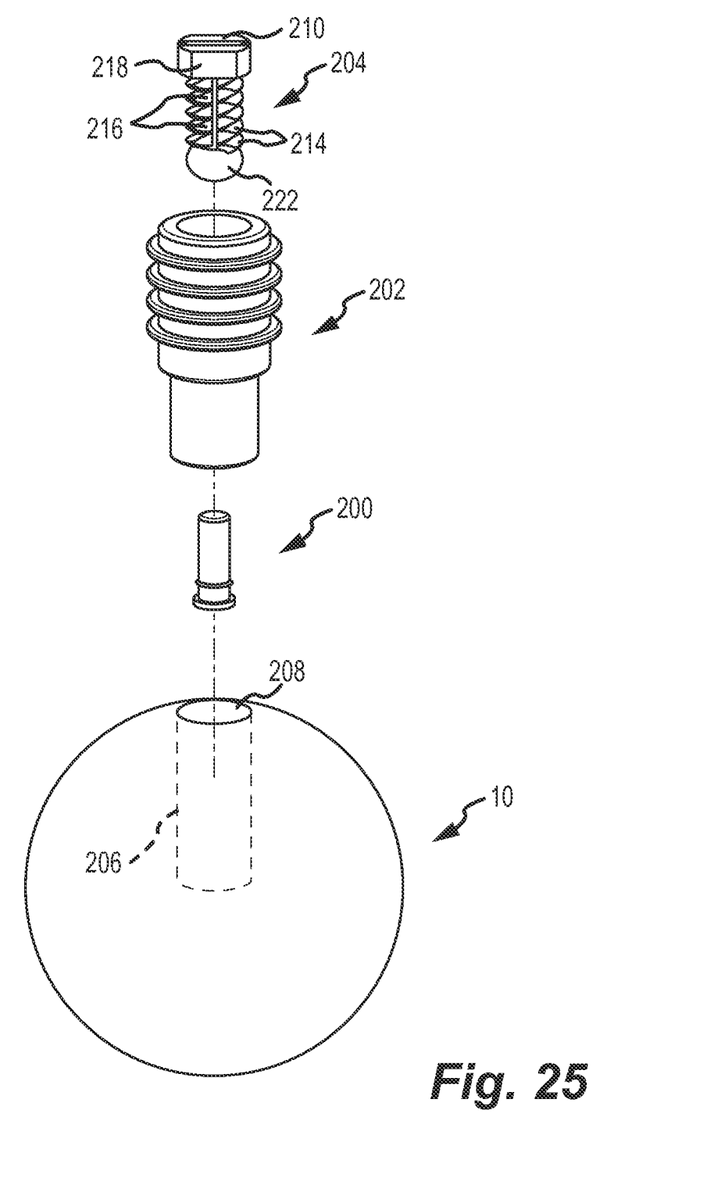
FIG. 25 is an exploded perspective view of yet another embodiment showing a different construction for incorporating a squeaker in a pet toy.

Referring to FIG. 25, another embodiment of the present invention is shown. In this embodiment, an alternate construction is illustrated for a squeaker assembly that is used to secure a squeaker. The squeaker assembly includes a noise making instrument, shown as a common squeaker 200, a squeaker housing 202, and a control screw 204 which is used as the control element to activate and deactivate operation of the squeaker 200. FIG. 25 also shows a generic pet toy 10 having an internal holding pocket 206. The internal holding pocket 206 is of the same flexible/elastomeric construction as the internal holding pockets of the other embodiments. The squeaker assembly is frictionally received through an opening 208 in the toy 10 and is held in place by the internal holding pocket 206.

Figure 26:
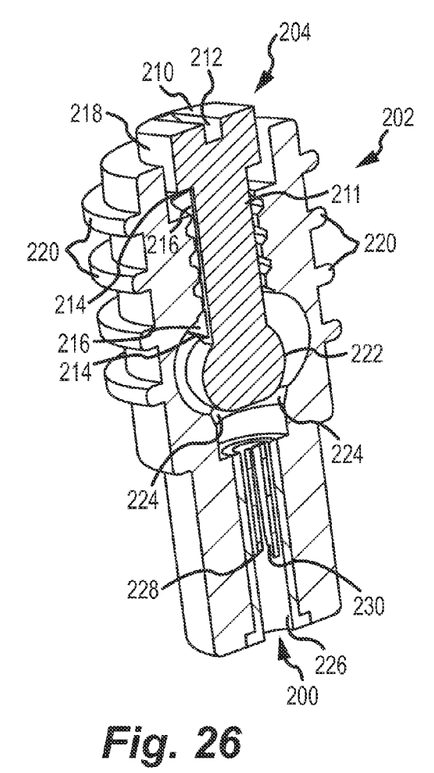
FIG. 26 is a greatly enlarged perspective cross-sectional view of a squeaker assembly according to the embodiment shown in FIG. 25 and illustrating a control element in a position allowing the squeaker to operate.
Figure 27:
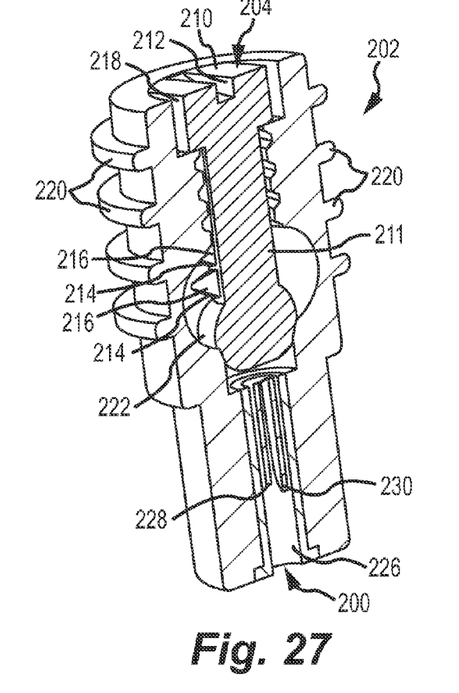
FIG. 27 is another greatly enlarged perspective cross-sectional view of the squeaker assembly shown in FIG. 26 and illustrating the control element in a position to deactivate the squeaker.
Figure 28:
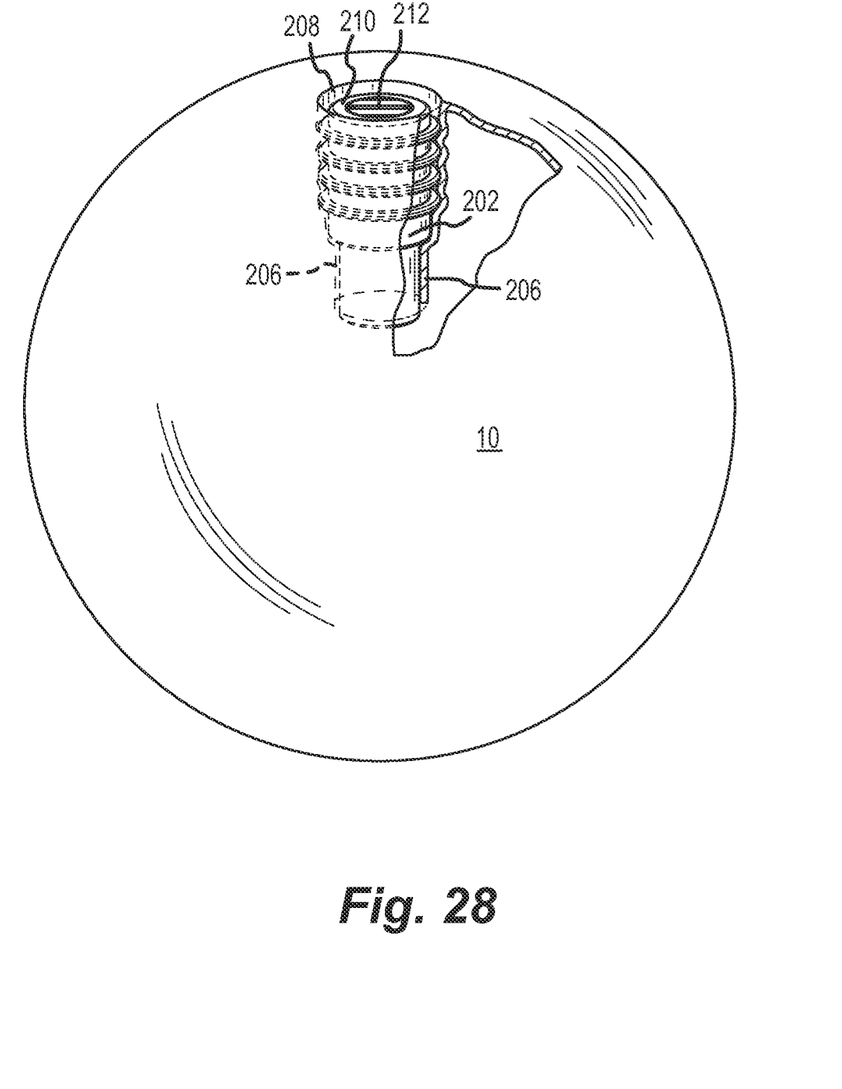
FIG. 28 is a fragmentary perspective view of the squeaker assembly of FIG. 25 installed in the pet toy.

Referring to FIGS. 26 and 27, details are illustrated for the squeaker assembly and squeaker. The squeaker housing 202 includes a plurality of external ribs 220 that serve to assist in better frictional engagement with the internal holding pocket 206. The ribs 220 can be selectively spaced from one another and provided with a desired diameter in order to have the ribs adequately engage the interior side wall of the internal holding pocket 206. The squeaker housing 202 has a bore or opening that extends through the housing. One end of the bore receives the control screw 204 and the other end of the bore receives the squeaker 200. The squeaker 200 represents a common squeaker device having a body 226, a vibrating reed 228, and a reed support 230 spaced between the reed 228 and the body 226. Although a particular construction for a squeaker is shown, it shall be understood that other noise making instruments may be employed that operate by air travelling through a continuous opening through the instrument.

For the control screw 204, it comprises a head 210 with a slot or groove 212 formed on the exposed surface thereof. The body 211 of the screw includes a plurality of external threads 214, and the distal end of the screw includes a ball or curved shaped element 222 as shown. The bore of the housing 202 is threaded at this location to threadably receive the control screw 204. The bore of the housing has an area of increased diameter as shown to receive the ball 222 of the control screw. Each of the external threads 214 have cut or removed portions 216 aligned with one another longitudinally along the length of the body 211. Additionally, the head 210 also has a cut or removed portion 218 that aligns with the removed portions 216 on the threads 214. The removed portions 216 and 218 therefore form a passageway through the housing.

In the position shown in FIG. 26, if the pet toy 10 is squeezed, air is able to travel from within the toy and out through the squeaker assembly. More specifically in this position, the ball 222 of the control screw 204 is spaced from a seat 224 within the bore formed by a progressively narrowing diameter at that location that communicates with the part of the bore that receives the squeaker 200. Air travels upwards through the squeaker, and through gaps between the interior surfaces defining the bore and the aligned removed portions 216 and removed portion 218. After squeezing, the pet toy returns to its normal un-deformed shape by air that travels back into the interior of the pet toy through the squeaker assembly.

Referring to FIG. 27, if it is desired to disable the squeaker to prevent it from making noise, the user may move the control screw 204 to a deactivated position by rotating the control screw so that the ball 222 contacts the seat 224. In this position, the ball 222 of the control screw blocks air from traveling through the bore of the housing 200. The slot 212 is preferably sized so that a standard screw driver, coin or other common implement may be used to quickly manipulate the control screw to place the squeaker assembly in either an activated or deactivated position.

Advantages to the construction of the squeaker assembly are clear. The squeaker assembly with the integral control screw allows the user to easily control activation and deactivation of the squeaker. Further, because the squeaker assembly is not accessible to the animal by virtue of its being retained in a recessed orientation within the internal holding pocket 206, the squeaker assembly does not present a choking hazard.

The pet toy of the present invention can be made of a resilient, flexible, material such as plastic, or from an elastomeric material such as rubber that prevents the animal toy from being consumed by the animal, and also helps to achieve the desired type of dental cleaning action in the animal's mouth. The toy is preferably made of a material flexible enough so that when the animal bites down on the animal toy, the sidewall 35 of the animal toy is allowed to deform or deflect, allowing the protrusions to shift or collapse in different directions thereby providing a scraping motion or movement which further helps to clean the animal's mouth. The housing 144 and the retaining element 146 are also preferably made of a rubber or a flexible plastic material.

From the foregoing, the advantages of the present invention are readily apparent. An animal or pet toy is provided that has a plurality of protrusions that result in dental cleaning. The particular arrangement of the protrusions and overlapping regions between sets of the protrusions further adds to dental cleaning capability and also can add to the structural strength of the pet toy. Selectively controlling the activation or deactivation of the squeaker is achieved by the use of a control element that may be easily manipulated by a user. The squeaker is located within a protected internal holding pocket such that it is very difficult for the animal to remove the squeaker.

What is claimed is:

1. A pet toy comprising:
a body member having an outer surface, a side wall defining a thickness of the body member, and an inner surface defining a substantially hollow core;
an internal holding pocket extending into said hollow core, said internal holding pocket having an internal sidewall;
a squeaker assembly inserted within said internal holding pocket, said squeaker assembly frictionally engaging said internal sidewalls thereby holding said squeaker assembly within said internal holding pocket;
said squeaker assembly including a housing, a control screw threadably received in one end the housing, a seat configured to engage with the control screw, and a squeaker device inserted in the other end of said housing, wherein said control screw has a first position that enables air to flow through said squeaker assembly to activate the squeaker assembly, and a second position where the control screw is sealed against the seat to prevent air flow through the squeaker assembly to deactivate the squeaker assembly.

2. A pet toy as claimed in claim 1, wherein:
said squeaker assembly includes a plurality of ribs formed on an exterior surface of said housing.

3. A pet toy as claimed in claim 1, wherein:
said control screw further includes first removed portions formed on threads of said control screw, and said control screw further includes a head with a second removed portion formed thereon, said first and second removed portions being aligned with one another forming a passageway through said squeaker assembly.

4. A pet toy, as claimed in claim 1, wherein:
said squeaker assembly further includes a ball formed on a distal end of said control screw.

5. A pet toy as claimed in claim 1, wherein:
said squeaker assembly has an upper surface that is recessed within an opening of said internal holding pocket thereby making access to said squeaker assembly more difficult for an animal.

6. A method of activating and deactivating a noise making instrument within a pet toy, said method comprising:
(i) providing:
(a) a body member having an outer surface, a side wall defining a thickness of the body member, and an inner surface defining a substantially hollow core;
(b) an internal holding pocket extending into said hollow core, said internal holding pocket having an internal sidewall;
(c) a squeaker assembly inserted within said internal holding pocket, said squeaker assembly frictionally engaging said internal sidewalls thereby holding said squeaker assembly within said internal holding pocket, said squeaker assembly including a housing, a control screw threadably received in one end the housing, a seat configured to engage with the control screw, and a squeaker device inserted in the other end of said housing, wherein said control screw has an activated position that enables air to flow through said squeaker assembly to activate the squeaker assembly, and a deactivated position where the control screw is sealed against the seat to prevent air flow through the squeaker assembly to deactivate the squeaker assembly; and
(ii) selectively moving the control screw between activated and deactivated positions to enable air to flow through said squeaker assembly, or to prevent air from flowing through said squeaker assembly, respectively.

7. A method, as claimed in claim 6, wherein:
selectively providing a plurality of ribs formed on an exterior surface of said housing.

8. A method, as claimed in claim 6, wherein:
selectively providing said control screw with first removed portions formed on threads of said control screw, and selectively providing said control screw with a head with a second removed portion formed thereon, wherein said first and second removed portions are aligned with one another forming a passageway through said squeaker assembly.

9. A method, as claimed in claim 6, wherein:
selectively providing said squeaker assembly with a ball formed on a distal end of said control screw, and said ball seals or unseals a seat within said squeaker assembly based upon positioning of the control screw.

10. A method, as claimed in claim 6, wherein:
locating said squeaker assembly so that an upper surface thereof is recessed within an opening of said internal holding pocket thereby making access to said squeaker assembly more difficult for an animal.

11. A pet toy comprising:
a body member having an outer surface, a side wall defining a thickness of the body member, and an inner surface defining a substantially hollow core;
an internal holding pocket extending into said hollow core, said internal holding pocket having an internal sidewall;
a squeaker assembly inserted within said internal holding pocket, said squeaker assembly frictionally engaging said internal sidewalls thereby holding said squeaker assembly within said internal holding pocket;
said squeaker assembly including a housing, a control element received in a bore of the housing, a ball formed on a first end of said control element distal to said outer surface, and a squeaker device also received in said housing, wherein said control element is selectively positionable to activate the squeaker assembly enabling air to flow through the squeaker assembly, and to deactivate the squeaker assembly to prevent air flow through the squeaker assembly.

12. A method of activating and deactivating a noise making instrument within a pet toy, said method comprising:
(i) providing:
(a) a body member having an outer surface, a side wall defining a thickness of the body member, and an inner surface defining a substantially hollow core;
(b) an internal holding pocket extending into said hollow core, said internal holding pocket having an internal sidewall;
(c) a squeaker assembly inserted within said internal holding pocket, said squeaker assembly frictionally engaging said internal sidewalls thereby holding said squeaker assembly within said internal holding pocket;
(d) said squeaker assembly including a housing, a control element received in a bore of the housing, a ball formed on a first end of said control element distal to said outer surface, and a squeaker device also received in said housing, wherein said control element is selectively positionable to activate the squeaker assembly enabling air to flow through the squeaker assembly, and to deactivate the squeaker assembly to prevent air flow through the squeaker assembly; and
(ii) selectively moving the control element between activated and deactivated positions to enable air to flow through said squeaker assembly, or to prevent air from flowing through said squeaker assembly, respectively.

* * * * *